US007724962B2

United States Patent
Zhu et al.

(10) Patent No.: US 7,724,962 B2
(45) Date of Patent: May 25, 2010

(54) CONTEXT ADAPTIVE APPROACH IN VEHICLE DETECTION UNDER VARIOUS VISIBILITY CONDITIONS

(75) Inventors: Ying Zhu, Monmouth Junction, NJ (US); Gregory Baratoff, Wangen-Feld (DE); David Jean Pascal Acunzo, Dinan (FR)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 69 days.

(21) Appl. No.: 11/825,619

(22) Filed: Jul. 5, 2007

(65) Prior Publication Data

US 2008/0069400 A1  Mar. 20, 2008

Related U.S. Application Data

(60) Provisional application No. 60/819,423, filed on Jul. 7, 2006.

(51) Int. Cl.
   *G06K 9/62* (2006.01)
(52) U.S. Cl. .............................. 382/225; 707/6; 701/200
(58) Field of Classification Search ................. 382/100, 382/103, 104, 159, 165, 169, 170, 181, 191, 382/192, 194, 195, 203, 224, 225, 226, 227; 707/6; 701/1, 2, 200, 300, 301, 302
See application file for complete search history.

(56) References Cited

U.S. PATENT DOCUMENTS 5,809,161 A * 9/1998 Auty et al. ................. 382/104

| | | | |
|---|---|---|---|
| 2006/0088207 A1* | 4/2006 | Schneiderman | 382/159 |
| 2007/0005356 A1* | 1/2007 | Perronnin | 704/245 |
| 2007/0014480 A1* | 1/2007 | Sirohey et al. | 382/240 |
| 2007/0291984 A1* | 12/2007 | Yang et al. | 382/103 |

OTHER PUBLICATIONS

Deselaers, Features for image retrieval, Dec. 2003, Lehrstuhlfur Informatik VI, RWTH Aachen University, Aachen, Germany, pp. 35,37.*
Zhu, Ying et al., "An Integrated Framework of Vision-Based Vehicle With Knowledge of Fusion", *Intelligent Vehicles Symposium, 2005. Proceedings. IEEE*(Jun. 6-8, 2005), 199-204.
Cabani, Iyadh et al., "Color-Based Detection of Vehicle Lights", *Intelligent Vehicles Symposium, 2005. Proceedings. IEEE*, (Jun. 2005),278-283.
Jain, A. K., et al., "Data Clustering: A Review", *ACM Computing Surveys, vol. 31, No. 3*, (1999),264-323.
Kim, Samyong et al., "Front and Rear Vehicle Detection and Tracking in the Day and Night Times Using Vision and Sonar Sensor Fusion", *Intelligent Robots and Systems, 2005. (IROS 2005). IEEE/RSJ International Conference*, (Aug. 2-6, 2007),2173-2178.

(Continued)

*Primary Examiner*—Anand Bhatnagar
(74) *Attorney, Agent, or Firm*—Donald B. Paschburg

(57) ABSTRACT

Adaptive vision-based vehicle detection methods, taking into account the lighting context of the images are disclosed. The methods categorize the scenes according to their lighting conditions and switch between specialized classifiers for different scene contexts. Four categories of lighting conditions have been identified using a clustering algorithm in the space of image histograms: Daylight, Low Light, Night, and Saturation. Trained classifiers are used for both Daylight and Low Light categories, and a tail-light detector is used for the Night category. Improved detection performance by using the provided context-adaptive methods is demonstrated. A night time detector is also disclosed.

21 Claims, 14 Drawing Sheets

OTHER PUBLICATIONS

Song, Kai-Tai et al., "Front Vehicle Tracking Using Scene Analysis", *Mechatronics and Automation, 2005 IEEE International Conference vol. 3*, (2005), 1323-1328.

Cucchiara, Rita et al., "Image Analysis and Rule-Based Reasoning for a Traffic Monitoring System", *IEEE Transactions on Intelligent Transportation Systems, vol. 1, No. 2*, (Jun. 2000), 119-130.

Schapire, Robert E., et al., "Improved Boosting Algorithms Using Confidence-rated Predictions", *Machine Learning*, 37(3):297-336, (1999), 1-40.

Sun, Zehang et al., "On-Road Vehicle Detection: A Review", *IEEE Transactions on Pattern Analysis and Machine Intelligence*, vol. 28, No. 5, (May 2005), 694-711.

Viola, Paul et al., "Rapid Object Detection using a Boosted Cascade of Simple Features", *Accepted Conference on Computer Vision and Pattern Recognition*, (2001), 1-9.

Zhu, Ying et al., "Reliable Detection of Overtaking Vehicles Using Robust Information Fusion", *IEEE Transactions on Intelligent Transportation Systems, vol. 7, No. 4*, (Dec. 2006), 401-414.

\* cited by examiner

CONTEXT ADAPTIVE APPROACH IN VEHICLE DETECTION UNDER VARIOUS VISIBILITY CONDITIONS

CROSS-REFERENCE TO RELATED APPLICATIONS

This application claims the benefit of U.S. Provisional Application No. 60/819,423, filed Jul. 7, 2006, which is incorporated herein by reference.

BACKGROUND OF THE INVENTION

The present invention relates to vision systems for the detection of vehicles. More in particular it relates to vision systems for vehicle detection that can adapt to changing visibility conditions.

Vision systems are widely used for driver assistance and safety applications. Vehicle detection can be one of the critical functionalities of camera systems used for driver assistance. A drawback of existing vision systems is that the performance of vehicle detection drops as the visibility condition deteriorates. Vision systems may work well under good visibility, but can not adapt well to deteriorating visibility and thus may not perform well under such conditions.

Accordingly a context adaptive approach to alleviate visibility limitations and improve detection performance in low visibility conditions is required.

SUMMARY OF THE INVENTION

One aspect of the present invention provides a novel method and system for improved detection of a vehicle in the context of varying light conditions using a single monocular camera.

In accordance with another aspect of the present invention a method is provided for adaptive detection of an object in an image, by using a plurality of clusters, each of the plurality of clusters being characterized by a range of values of one or more statistical parameters associated with a prior image, each cluster being part of a category, comprising: receiving the image; determining a value for each of the one or more statistical parameters of the image; assigning the image to one of the plurality of clusters according to the determined value of each of the one or more statistical parameters of the image; selecting a classifier for detecting the object based on the category associated with the assigned one of the plurality of clusters; and detecting the object using the classifier.

In accordance with a further aspect of the present invention a method is provided for off-line learning of rules for determining light conditions from an input image.

In accordance with another aspect of the present invention a method is provided for constructing a detector for a light condition for the detection of an object.

In accordance with another aspect of the present invention a method is provided wherein the object is a vehicle.

In accordance with a further aspect of the present invention a method is provided wherein a plurality of categories includes at least a category of low light condition, day light condition, night condition and image saturation.

In accordance with another aspect of the present invention a method is provided wherein the one or more statistical parameters of the image include the histogram of the image, and statistics derived from the histogram of the image.

In accordance with a further aspect of the present invention a method is provided further comprising clustering a plurality of images into k clusters by applying a k-mean algorithm.

In accordance with another aspect of the present invention a clustering algorithm is provided in the space of image histograms using Bhattacharyya distance between two histograms as a distance metric for measuring the similarity between two histograms.

In accordance with another aspect of the present invention a method is provided wherein the classifier will detect the object by recognizing one or more features of a plurality of features of the object in an image, the success of recognizing a feature of the object depending on lighting conditions.

In accordance with a further aspect of the present invention a method is provided wherein the classifier is trained to look for one or more features to detect the object, the one or more features being optimal for detection under determined lighting conditions.

In accordance with another aspect of the present invention a method is provided wherein the object is a vehicle and the plurality of features includes at least one of the group of features of edge, texture, contour and tail-lights of the vehicle.

In accordance with a further aspect of the present invention a method is provided wherein the training of the classifier is assisted by a classification algorithm.

In accordance with another aspect of the present invention a method is provided wherein the classification algorithm is AdaBoost.

In accordance with a further aspect of the present invention a system is provided which can perform and execute the steps of the methods here provided as aspects of the present invention.

DESCRIPTION OF A PREFERRED EMBODIMENT

Figure 1:
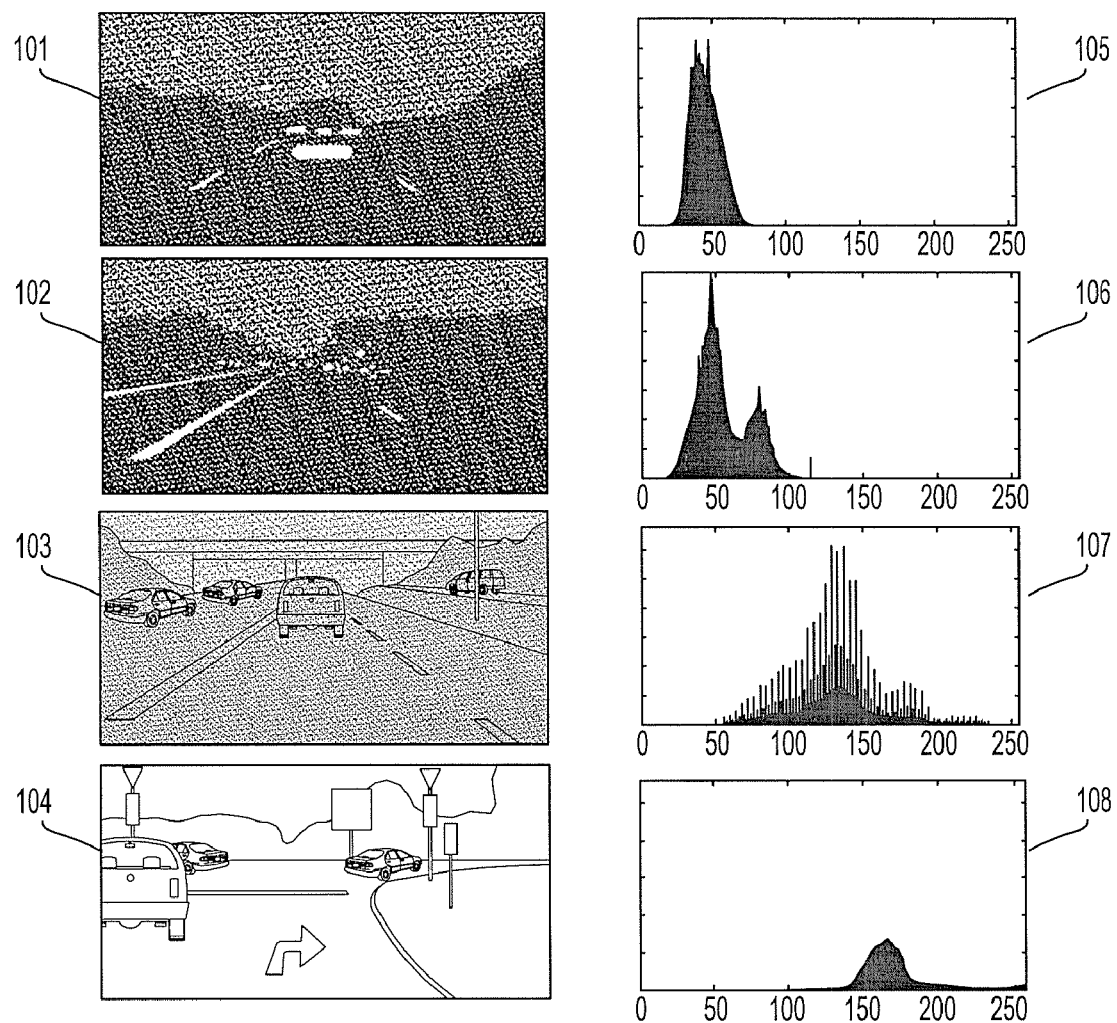
FIG. 1 comprises a series of images captured in various lighting conditions and related histograms.

Extensive research has been carried out recently for driver assistance systems involving on-board vision sensors. The main motivations for this research are the increasing need for safer roads, the decreasing cost of visual sensors and the improved computing power offered by modern technologies. Related applications include lane departure warning, traffic sign recognition, pedestrian and vehicle detection systems. To realize these functionalities, challenging problems need to be addressed. Since the sensor is on-board and seeing outdoors scenes, such a system needs to be robust enough to deal with random and drastic changes of the environment. Numerous previous studies related to vehicle detection systems focused on the robustness against the large variance of vehicles' appearance, while assuming fairly constant lighting conditions.

A review of several studies is provided in Z. Sun, G. Bebis, and R. Miller. On-road vehicle detection: A review. *Transactions on Pattern Analysis and Machine Intelligence*, 28(5), May 2006. However, equally important is the issue of being able to deal with drastic changes of the lighting conditions in an outdoor environment. It is believed that fewer works have addressed this challenging problem. In R. Cucchiara, M. Piccardi, and P. Mello, Image analysis and rule-based reasoning for a traffic monitoring system, in *IEEE/IEEJ/JSAI ITS '99*, pages 758-763, October 1999, and in S. Kim, S.-Y. Oh, J. Kang, Y. Ryu, K. Kim, S-C. Park, and K. Park, Front and rear vehicle detection and tracking in the day and night times using vision and sonar sensor fusion, in *IEEE International Conference on Intelligent Robots and Systems*, pages 2173-2178, 2005, the authors proposed a system that switches between day and night. A system described in I. Cabani, G. Toulminet, and A. Bensrhair, Color-based detection of vehicle lights, in *IEEE Intelligent Vehicle Symposium* 2005, pages 278-283, June 2005, deals with reduced visibility conditions with a stereo sensor and color detection. In K.-T. Song and C-C. Yang, Front vehicle tracking using scene analysis, in *IEEE International Conference on Mechatronics and Automation* 2005, volume 3, pages 1323-1328, July 2005, the author presented a vehicle tracking scheme for both daytime and night time. However, a system able to perform smooth transition from daylight to night using only one monocular camera has yet to be developed.

It is an aspect of the present invention to perform the detection of preceding vehicles driving in the same direction as a host car. The data acquisition apparatus for detection may include a single monocular CMOS camera mounted inside the host vehicle and capturing image sequences of road scenes ahead. As an aspect of the present invention a vehicle detection method is provided to deal with changes of lighting conditions from bright day to night, taking into account transitional contexts such as dawn, dusk, and other low light conditions.

In Y. Zhu, D. Comaniciu, M. Pellkofer, and T. Koehler, Reliable detection of overtaking vehicles using robust information fusion, in IEEE Transactions on Intelligent Transportation Systems, Vol. 7, Issue 4, pages 401-414, December 2006, and in Y. Zhu, D. Comaniciu, M. Pellkofer, and T. Koehler, An integrated framework of vision-based vehicle detection with knowledge fusion, in *IEEE Intelligent Vehicles Symposium*, pages 199-204, June 2005, it was noticed that a drop of performance occurred when the lighting condition changed (e.g. during dawn and dusk), which motivated the inventors to focus efforts on the systems and methods being presented here as an aspect of the present invention.

A novel detection method is provided as an aspect of the present invention called context-adaptive detection. Two key ideas of the method are 1) Automatic context categorization of the input frames based on the histogram of pixel intensities and 2) Context-adaptive detection using specialized classifiers to deal with each context.

Overview of the Method

The goal is to build a robust autonomous vehicle detection system that can deal with various lighting conditions, which changes the appearance of vehicles drastically. FIG. 1 shows images 101, 102, 103 and 104 captured under various lighting conditions. One may be aware that during daytime, the most salient features are the objects' contours and textures. At night, such texture information is lost, but for instance tail-lights of a vehicle are easily perceived. During the transition time of dawn and dusk, both information may be present, but with variable saliency and contrast. These changes need to be taken into account by the detector in order to achieve satisfactory performance in each case. The lighting aspects of the example images in FIG. 1 are reflected by the shape of their corresponding histograms 105, 106, 107 and 108.

Herein one is dealing with an uncontrolled environmental condition, i.e. the ambient light, which introduces additional variation in vehicle appearance besides the variation already existing among different types of vehicles. The conventional approach of distinguishing vehicles from backgrounds with a binary classifier such as described in: Z. Sun, G. Bebis, and R. Miller, On-road vehicle detection: A review, in *Transactions on Pattern Analysis and Machine Intelligence*, 28(5), May 2006, would be insufficient to handle large changes of lighting conditions. Similar problems have been addressed in computer vision research in the area of multi-view object detection, where pose changes introduce large variation in object appearance. It has been shown that categorizing the object appearance according to its shapes and combining individual specialized binary classifiers substantially improves the performance of an object detector as was shown in Y. Shan, F. Han, H. S. Sawhney, and R. Kumar, Learning exemplar-based categorization for the detection of multi-view multi-pose objects, in *IEEE Computer Society Conference on Computer Vision and Pattern Recognition*, volume 2, pages 1431-1438, June 2006.

Following a similar idea, captured image frames are categorized into sub-classes according to the lighting condition and a dedicated detector is created for each category.

A simple way to deal with vehicle detection during day and night time would be to use a specialized detector for each of the two cases: a daytime detector focusing on texture information and a night time detector utilizing tail-light information. As proposed in S. Kim, S.-Y. Oh, J. Kang, Y. Ryu, K. Kim, S-C. Park, and K. Park, Front and rear vehicle detection and tracking in the day and night times using vision and sonar sensor fusion, in *IEEE International Conference on Intelligent Robots and Systems*, pages 2173-2178, 2005, the system would switch from one detector to the other according to the mean value of the pixels intensities. In such a system, one can expect a drop of performance during transition time, when the main features of vehicle appearance is a mix of tail-lights and textures.

Figure 2:
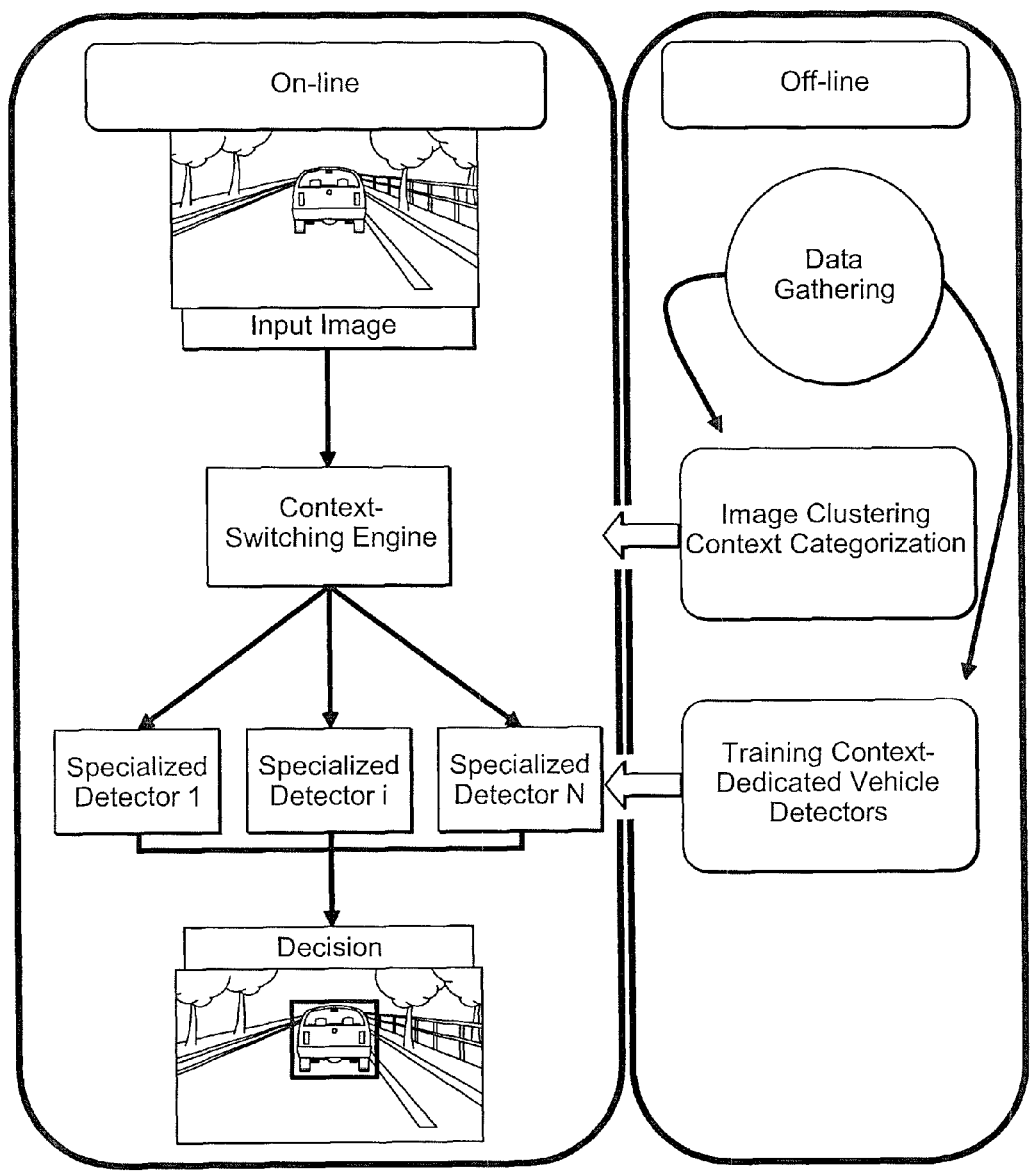
FIG. 2 illustrates a method in accordance with one aspect of the present invention.

In order to build a scheme able to switch smoothly from day time to night time, two problems need to be addressed: 1) Define a context variable to characterize the lighting condition; 2) Build a dedicated classifier for each context. FIG. 2 shows the principles of the method as an aspect of the present invention. Off-line tasks, shown on the right hand side of the figure, refer to preliminary stages necessary to implement a context-adaptive system based on the method. On-line tasks, performed when images are acquired, are shown in the left hand side of the figure.

In the learning stage of a detector two stages may be identified. A first stage for learning the rules to determine the light condition from an input image. This involves two steps. The first step is to apply a clustering algorithm (k-mean) to learn the cluster centers of multiple clusters, as well as the rule to determine which cluster an input image should belong to based on the statistical parameters of the image. For this the Bhattacharyya distance may be used between the image histogram and the histogram associated with a cluster center to find the cluster whose center is closest to the image in terms of Bhattacharyya distance. The second step is to map the cluster to a context category, i.e. a light condition.

In a second stage a specific detector is constructed for each light condition. For bay light condition and Low light condition, the detectors are constructed as binary classifiers to distinguish vehicles from non-vehicles in an image associated with a corresponding light condition. This may be done by collecting training samples (i.e. vehicle and non-vehicle image samples) from each lighting condition, and use a learning algorithm, for instance AdaBoost to train a specific binary classifier (vehicle vs. non-vehicle) for the particular lighting condition. For different light conditions, different features may be used in training the corresponding classifier. A detector for the Night condition is described in Y. Zhu, X. Gao, G. Baratoff, and T. Koehler, "Preceding vehicle detection and tracking at night with a monocular camera", submitted to *IEEE ITSC*, 2007. The details of such a detector will be described in a separate section of this disclosure.

In the off-line processing steps, first image samples are acquired reflecting various lighting conditions. Clustering is then performed based on the histograms of these images. The clustering scheme identifies different contexts, which enables the learning of dedicated classifiers on vehicle and non-vehicle examples acquired from the corresponding context. A context classification scheme is also performed on-line by a context-switching engine in order to switch to the appropriate detector dedicated to the context of the input image.

Context Categorization

A. Lighting Context

The concept of lighting context will be introduced to describe the condition of environment lighting, which is reflected in the measurable image intensities. In addition to ambient lights, image intensities also depend on camera parameters such as exposure time, camera gain, etc. Since vehicle detection will be performed in the image domain, it is more tangible to define the lighting context from a space that integrates all of the above imaging parameters. The histogram, being the distribution of the pixel values of an image, reflects its overall intensity level and is considered to be a viable indicator of the lighting context. A number of traffic scenes are shown in FIG. 1 along with their histograms. One can observe a strong correlation between the distribution of the pixel values and the lighting conditions, which suggests that the histogram is a good indicator to determine the lighting context.

It is worth to point out that not all image pixels are relevant to describe the context in which our target objects are present. Because of the settings of the data acquisition system in FIG. 1 the upper third of the frames shows large variations because of various objects that can occlude the sky, such as trees, mountains or buildings. These variations make it more complex to infer the lighting context. In comparison, the lower two-thirds of the image, covering the road surface and the vehicle appearance, show more consistent and stable distribution of the pixel intensities. Consequently the lighting context of an image will be defined from the histogram of its lower two-thirds.

In a first step, called image clustering, image samples are partitioned into several clusters. In a second step, called context categorization, each cluster is assigned a context category.

B. Image Clustering

Image samples are first grouped into a number of clusters, where images with similar histograms are categorized into a same cluster. The criterion retained for clustering is the similarity between histograms of image lower parts. Substantial work has been carried out on data clustering, and many algorithms and similarity measures have been developed for that purpose such as described for instance in A. K. Jain, M. N. Murty, and P. J. Flynn, Data clustering: A review, in *Computing Surveys*, 31(3), September 1999. The k-mean algorithm shown as Algorithm 1 below is used in the present work for image clustering.

Algorithm 1: k-Means Clustering Algorithm
Given: N patterns to be clustered
Choose k cluster seeds, to coincide with k patterns chosen to
    represent a variety of lighting conditions
Repeat
    Assign each pattern to the closest center
    for all k clusters do
    Recompute the cluster centers using the current
    cluster membership
    end for
until the convergence criteria is met
return the k centers from last iteration In the k-means algorithm, the number k of clusters is chosen a priori, and the final clustering depends on the initial conditions. Since one wants to group images according to their context, it is an advantage to keep some control over the clustering process through the choice of the initial seeds, to guarantee that the clustering results are relevant to the present purpose. The output of the k-means algorithm is the k cluster centroids obtained when the convergence criterion is reached, and each image sample is assigned a cluster label.

In one implementation, it is elected to use the following distance measure derived from the Bhattacharyya coefficient, $$D_B(H_1, H_2) = 1 - \sum_{j=1}^{N_b} \sqrt{H_{1,j} \times H_{2,j}}$$

where $H_{i,j}$ denotes the $j^{th}$ bin of the histogram $H_i$ and $N_b$ denotes the number of bins. The distance measure is bounded, i.e. $0 \leq D_B(H_1,H_2) \leq 1$. Note $D_B(H_1,H_2)=1$ when there is no overlapping between $H_1$ and $H_2$, and $DB(H_1,H_2)=0$ when $H_1$ and $H_2$ are identical. Other alternatives can be considered, such as the Euclidean or Wasserstein distances.

Figure 3:
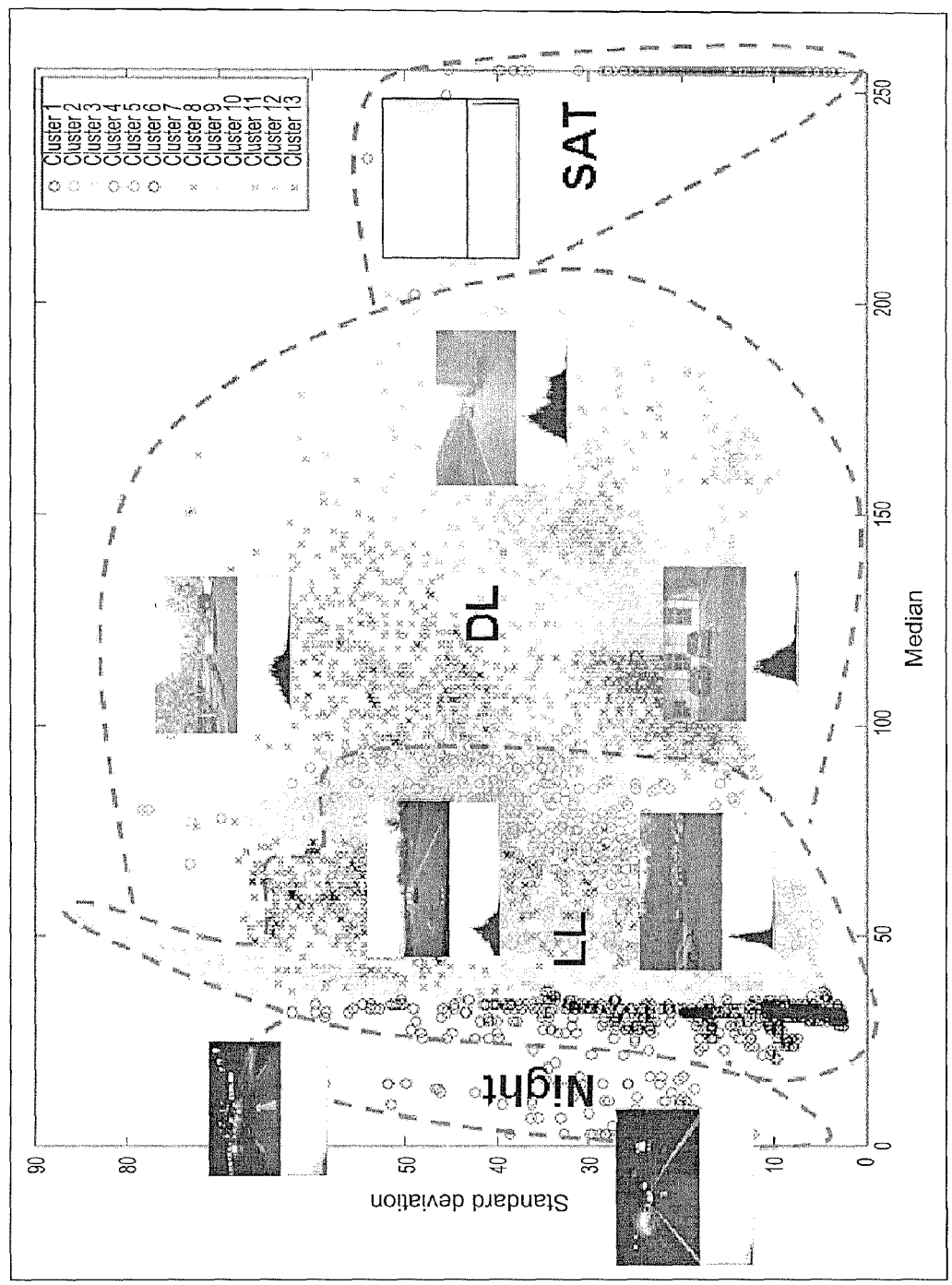
FIG. 3 illustrates a plurality of clusters and related clusters in accordance with another aspect of the present invention.

For saturated images, majority of image pixels assume values only in the lowest (from 0 to 9 for 8 bit image) and highest bins (from 245 to 255 for 8 bit images) in their histograms. It is straightforward to identify saturated images from their histograms by examining the percentage of pixels falling into the lowest and highest bins. The saturated frames are first identified and assigned to a separate cluster and excluded from the remaining clustering process. For the remaining images, the lowest (from 0 to 9) and highest pixel values have been excluded from the calculations to get rid of the border effects. The Bhattacharyya distance measure was used by the k-mean clustering algorithm to group images into twelve clusters. Overall, thirteen clusters were obtained as one can see in FIG. 3. FIG. 3 further illustrates, in general, the type of image and histogram associated with a particular cluster of images. In general, the relationship between the categories and the images are as follows:

Cluster 1: Images of Night Condition.

Cluster 6, cluster 9, cluster 13, cluster 2, cluster 5, cluster 3: Images of Low Light Condition. They typically include images of dusk, dawn, or in tunnels with low ambient lights.

Cluster 7, cluster 8, cluster 10, cluster 11, cluster 12: Image of Day Light Condition. They typically include images captured during day time with bright ambient lights.

Cluster 4: Saturated images.

In practice, the number of clusters k is defined to achieve a good tradeoff between complexity and within-class variation. FIG. 3 shows the initial clustering results with k=13 clusters in the present implementation as one possible embodiment.

C. Context Categorization

Figure 4:
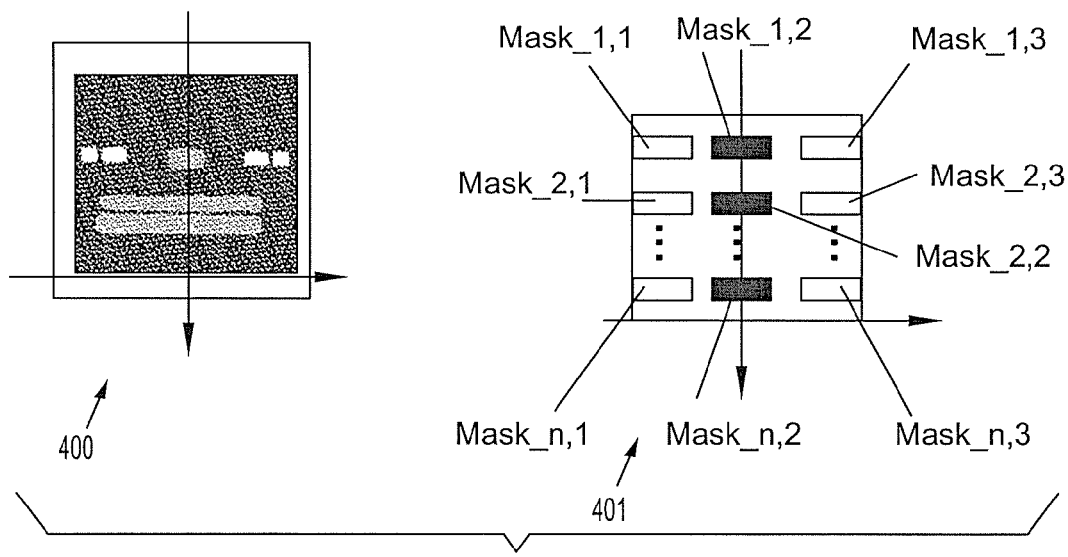
FIG. 4 illustrates a method for classifying features of a car.

After the initial clustering step, one obtains k clusters, with k large enough to achieve low within-class variation. One possibility is to build a specific detector for each image cluster, but this may lead to an overly complex and computationally expensive system. To prevent this, the k clusters are merged into C categories, with k>C. This procedure is called context categorization, where a cluster label is mapped to a context label. In this procedure, one has the control over the number of categories C, and how to group the clusters into categories. This allows keeping a balance between within-class variance and computational complexity. The final category would define the context label. In the present implementation four categories are defined (C=4): Night, Low Light (LL), Daylight (DL) and Saturation. FIG. 4 shows a representation of the 13 clusters grouped into the 4 categories, with some representative examples from each category. In practice, one will allow overlaps between different context categories by sharing clusters on the boundary to guarantee smooth transition between different categories.

D. Context-Switching Engine

A context-switching engine is used on-line to assign each incoming frame with a context label. The context-switching engine first decides on the cluster label by identifying the nearest centroid among the k clusters. The final context label is assigned to the image through context categorization.

Vehicle Detectors for Daylight and Low Light Conditions

Vehicle/Non-Vehicle Classification via Boosting: The AdaBoost algorithm, presented in R. E. Schapire and Y. Singer, Improved boosting algorithms using confidence-rated predictions, in *Machine Learning*, 37(3):297 336, 1999, is used as one embodiment to train vehicle detectors for Daylight and Low Light conditions with appearance cues, though many other alternatives can be considered, such as SVM or Neural Networks. AdaBoost learns a strong classifier composed of a number of weak classifiers $\{h_i\}$, $$H(I) = \sum_{i=1}^{N} \alpha_i h_i(I)$$

where I denotes an image sample being classified, N denotes the number of boosting rounds performed, $h_i$ denotes the i-th weak classifier ($h_i(I) \in \{-1,+1\}$), and $\alpha_i$ denotes its weight. The final decision sign[H(I)] on an image patch depends on the weighted votes from the weak classifiers. The classification label assigned to the image I is sign[H(I)]. AdaBoost is an iterative learning algorithm where training samples are re-weighted and a series of new weak classifiers are learned. In each iteration a weak classifier that best discriminates the weighted samples is chosen. The weight $\alpha_i$ of the resulting weak classifier is determined by the classification error. The sample distribution is then modified by increasing the weights of the misclassified samples and decreasing the weights of samples classified correctly. This allows weak classifiers focusing on the previously misclassified examples to be selected.

Under Daylight condition, vehicle appearance is fully visible, and salient features include edges, textures and contours. To train vehicle detectors with AdaBoost algorithm, a set of image filters were designed by the inventors to characterize salient features of vehicle appearance, as disclosed in U.S. patent application Ser. No. 11/313,599, filed on Dec. 21, 2005 by Y. Zhu, B. Xie, V. Ramesh, M. Pellkofer, T. Kohler, entitled: "System and Method for Detecting Features From Images of Vehicles, which is incorporated herein by reference in its entirety. When the ambient light is decreasing, a part of this information is lost, but tail-lights become a more salient feature. Consequently image features that represent tail-lights for the Low Light condition are also included to deal Low Light condition.

Separate classifiers are trained for different light conditions. Features used in training a dedicated classifier for Day light condition include features of edges, textures, contours of vehicles. This is documented in earlier cited U.S. patent application Ser. No. 11/313,599. Features used in training a dedicated classifier for Low light condition include features of edges, textures, contours and tail-lights of vehicles. FIG. 4 illustrates a method for calculating tail-light features from an image of a car 400 by using a mask as shown in 401. Denote l(x,y) as the pixel intensity at location (x,y). The tail-light features are defined as feature value = $\max\{V_1, V_2, \ldots, V_n\}$ where $$V_i = \frac{\sum_{(x,y)\in\text{Mask}\_i,1} I(x, y)}{\text{number of pixels in Mask}\_i, 1} - \frac{\sum_{(x,y)\in\text{Mask}\_i,2} I(x, y)}{\text{number of pixels in Mask}\_i, 2} + \frac{\sum_{(x,y)\in\text{Mask}\_i,3} I(x, y)}{\text{number of pixels in Mask}\_i, 3} \text{ with } (i = 1,2, \ldots, n).$$

By varying the size (i.e. width and height) of the masks, one obtains a number of tail-light features.

Figure 5:
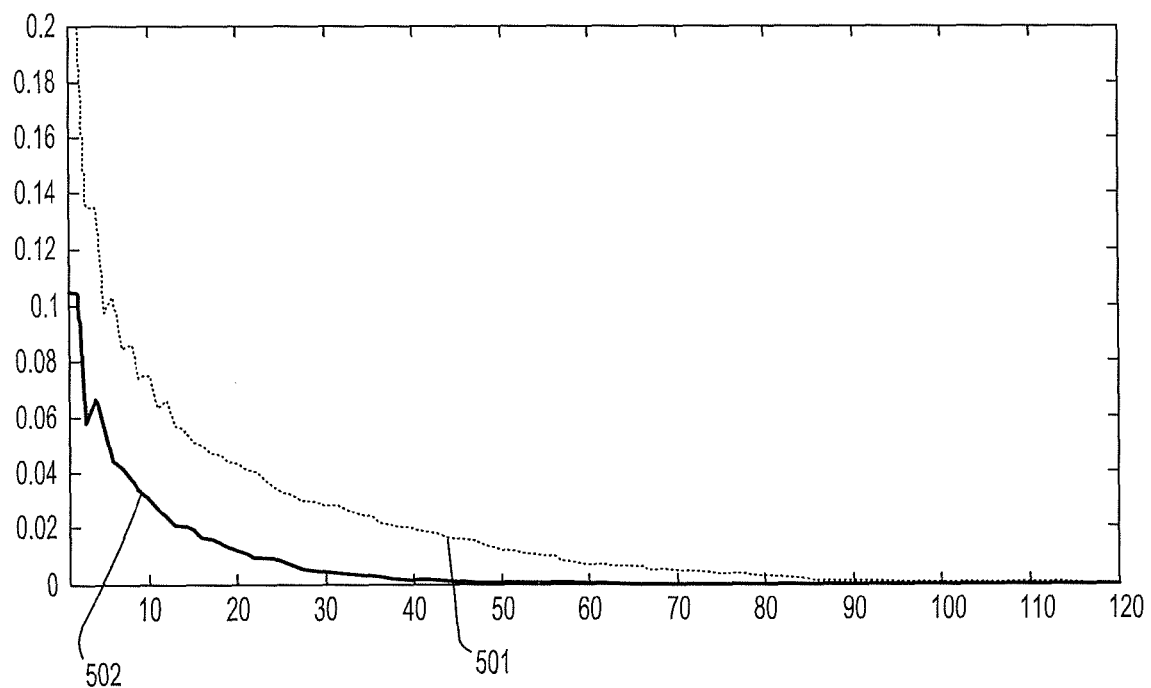
FIG. 5 shows the performance of classifiers on corresponding training data in accordance with one aspect of the present invention.

Training the Classifiers: The classifiers are trained over a large number of vehicle and non-vehicle images from each category. To stabilize the classifier performance, several rounds of bootstraps were performed to extend the set of training data. This procedure comprises extending the non-vehicle dataset by running the classifier on testing images and adding the false alarm examples into the training data. FIG. 5 shows the performance of classifiers on the corresponding training data in one experiment. For experimental comparison, Haar wavelet-like features are also included as presented in P. Viola and M. J. Jones, Rapid object detection using a boosted cascade of simple features, in *IEEE CVPR* 2001, pages 511-518, December 2001. The Daylight classifier shown here was trained over 1,972 positive and 6,214 negative samples. The Low Light classifier was trained over 3,026 positive and 6,862 negative samples. FIG. 5 shows that the Low Light classifier is more difficult to train. Indeed, the Low Light classifier covers cases from late afternoons to early evenings, with vehicle tail-lights turned on and off, which results in higher within-class variation compared to the Daylight classifier. In FIG. 5 the curve 501 shows the training error of the Low Light detector. The curve 502 shows the training error of the Daylight detector.

Vehicle Detector for Night

As FIG. 3 illustrates, in the context category labeled as Night condition, the texture information about vehicle appearance is completely lost. Instead, vehicle lights become the only stable and salient feature for detecting and tracking vehicles. A specific vehicle detector has been developed for the Night condition as described in Y. Zhu, X. Gao, G. Baratoff, and T. Koehler, Preceding vehicle detection and tracking at night with a monocular camera, in a manuscript submitted to *IEEE ITSC*, 2007, which detects and tracks vehicle tail lights.

Experiments

Experimental Framework

1) Image Clustering and Context Categorization: Image clustering was performed on a set of 8046 images from a database. The pixel values of the lower part of the image were binned into 51 bins. 34 iterations were performed by the k-mean algorithm before the convergence criterion was reached. As described earlier, each of the 13 clusters was then categorized into one of four categories: Night, Low Light, Daylight and Saturation. The results of the image clustering and context categorization are shown in FIG. 4.

Figure 6:
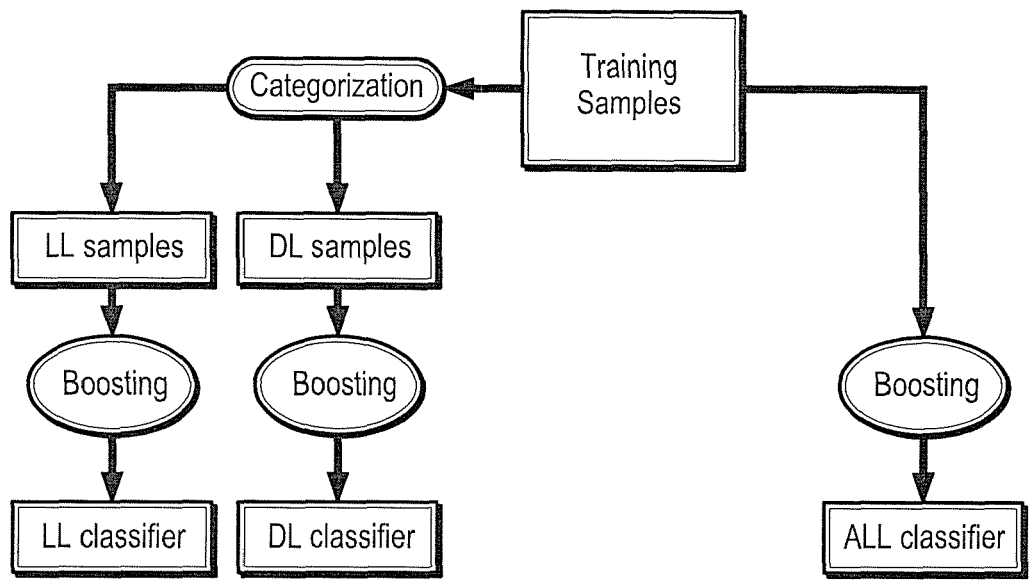
FIG. 6 illustrates training steps of classifiers in accordance with another aspect of the present invention.
Figure 7:
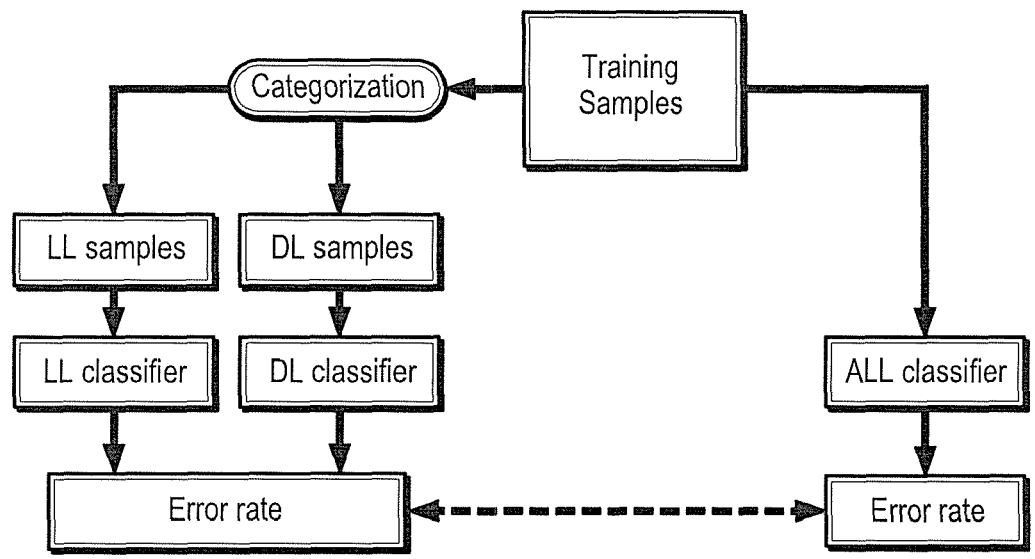
FIG. 7 illustrates a testing process for classifiers in accordance with one aspect of the present invention.

2) Validation Experiments: Once the categories of context have been defined, a set of vehicle and non-vehicle examples were extracted from sequences of images from each category. For the validation experiments described here, Low Light and Daylight samples were used to train and test vehicle classifiers. This process is shown in diagram in FIG. 6. Also a non-specialized classifier is trained with the whole set of training samples. A k-fold cross-validation, with k=5, has been performed on the set of vehicle and non-vehicle examples from Low Light and Daylight frames. A total of 3775 vehicle examples and 9718 non-vehicle examples in the Low Light condition, and 2465 vehicle examples and 9646 non-vehicle samples in the Daylight condition were used in the validation. As FIGS. 6 and 7 illustrate, the validation process can be described as follows. For each round of the cross-validation, three classifiers were trained:

A Low Light classifier trained with the set of Low Light training samples

A Daylight classifier trained with the set of Daylight training samples

A non-specialized classifier trained with the whole set of training samples

In each classifier trained with the AdaBoost algorithm, 250 features were used. The flow of this process is shown in FIG. 6. To evaluate the performance of the context-adaptive classification, the error rate of the non-specialized classifier (named ALL) were compared with the error rate of the context-adaptive detector over all the testing data. The error rate of the context-adaptive detector is calculated by accumulating the error of the two specialized classifiers in their respective context. The flow of the testing process is shown in FIG. 7.

Experiment Results

Test results are provided in the following tables.

TABLE 1

| | Average Number of False Alarms | | | | | |
|---|---|---|---|---|---|---|
| True Det. Rates | ALL | | LL | | DL | |
| | non-adapt. | adapt. | non-adapt. | adapt. | non-adapt. | adapt. |
| 1.000 | 311.5 | 274.4 | 368.4 | 331.8 | 27.4 | 5.4 |
| 0.999 | 196.8 | 166.0 | 224.0 | 199.2 | 13.4 | 1.6 |
| 0.998 | 119.8 | 84.6 | 158.0 | 140.8 | 7.2 | 1.2 |
| 0.997 | 89.8 | 58.0 | 85.6 | 77.8 | 5.4 | 0.8 |
| 0.996 | 70.2 | 47.6 | 76.0 | 66.4 | 3.2 | 0.8 |
| 0.995 | 53.2 | 34.4 | 63.4 | 48.6 | 2.6 | 0.8 |
| 0.990 | 23.0 | 10.8 | 27.4 | 20.8 | 0.6 | 0.6 |
| 0.985 | 15.2 | 5.8 | 16.6 | 9.2 | 0.4 | 0.6 |
| 0.980 | 10.8 | 3.6 | 12.4 | 6.2 | 0.2 | 0.6 |
| 0.970 | 5.6 | 2.2 | 5.8 | 2.8 | 0.2 | 0.4 |

Average numbers of test samples are provided in the following table.

TABLE 2

| | Average Number of Test Samples | | |
|---|---|---|---|
| | LL | DL | ALL |
| vehicles | 754.8 | 492.4 | 1247.2 |
| non-vehicles | 1713.6 | 1544.2 | 3257.8 |

Figure 8:
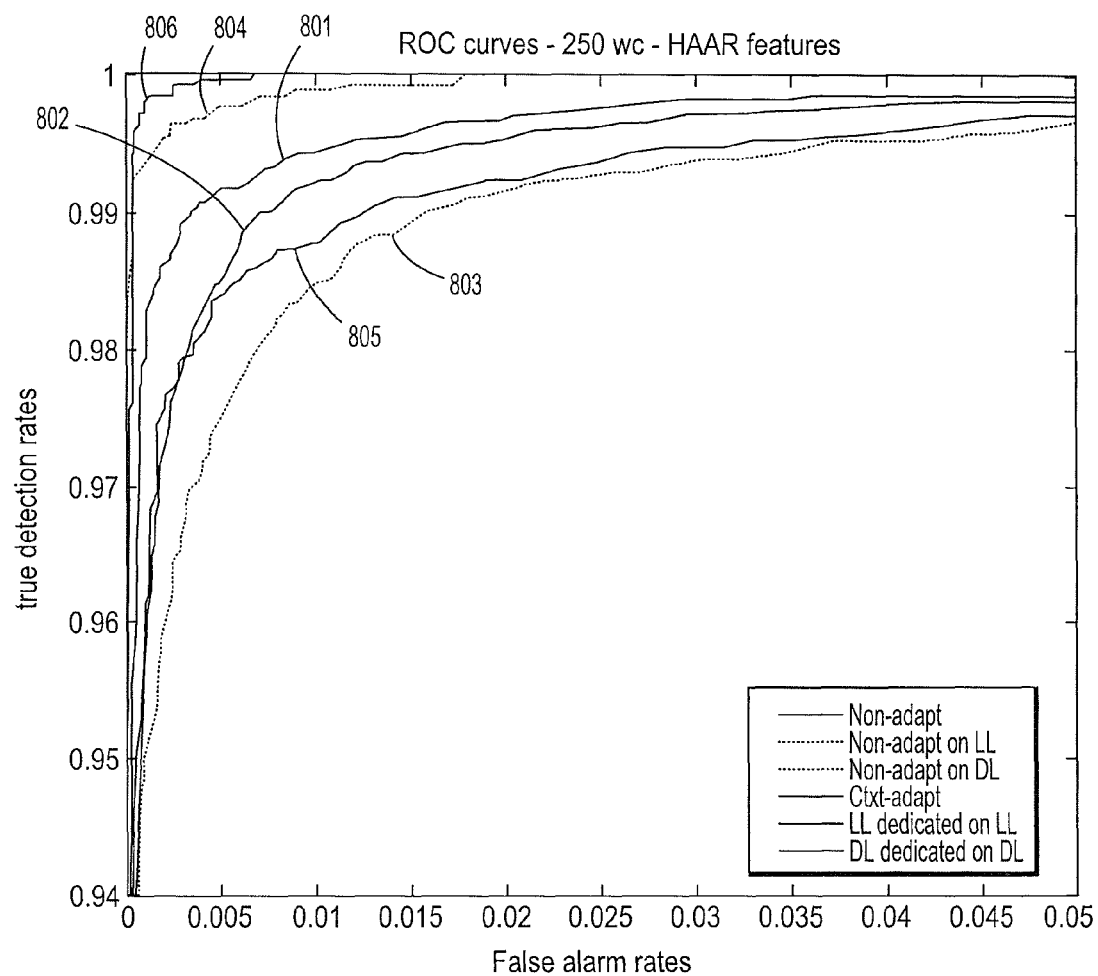
FIG. 8 illustrates a comparison of the performance of different detectors on testing data.

In FIG. 8 and Tables 1 and 2 the performance of the different detectors on the testing data are compared. Tables 1 and 2 show sets of values for the ROC curves in FIG. 8 of the different trained classifiers. The number of samples and false alarms is the average over the different k-fold rounds. FIG. 8 shows the ROC curves comparing the performance of the context-adaptive classifier (identified line 801) vs the non-adaptive classifier (identified line 802) on the testing datasets. The performance of the non-adaptive classifier on each context category is displayed in dotted lines (dotted line 803 for LL, dotted line 804 for DL). The performances of the dedicated classifiers are displayed in solid lines (solid line 805 for LL, solid line 806 for DL). Each ROC curve was generated by averaging the error rates obtained in 5-folder cross-validation. Quantitative results are also given in Table 1.

A considerable improvement can be observed when using the context information of the image. The more difficult category of the two is the Low Light one. This is consistent with the training results shown in FIG. 5. The classification performance increases for both categories when using the dedicated classifiers, which is particularly valuable for the Low Light case, for which the non-adaptive classifier shows poor performances.

When running the detection algorithm on images of actual road scenes, the detector scans image frames and performs classification at each image location to determine if a vehicle appears. Each frame contains a limited number of vehicles, and most of the scanning areas being tested are non-vehicle patches. Consequently, even a small drop of the false alarm rate will decrease significantly the number of false alarms. In the performed experiment, for a 100% true detection rate, the non-adaptive classifier shows a minimum false alarm rate of 0.096, which drops to 0.084 when using the context adaptive classifiers.

Other experiments have also been run, where a different number of weak classifiers were used and included different kinds of features. The results obtained in those experiments are similar to the ones shown here, which confirms the expected performance improvement introduced by context adaptation. The performance improvement shown here is consequently not specific to the parameters used in the classifiers.

Test on Road Scene Images

Experiments on images captured of actual road scenes were also conducted. To test the context-adaptive detector, a set of 20 images was randomly extracted from videos captured on the road at different time of the day, including 10 images under the Low Light condition and 10 images under the Daylight condition. In order to detect vehicles of different sizes with the same classifiers, each image was resized multiple times. A scanning window was used to test various image locations to determine if there was any vehicle present. A total of 74853 image patches were tested in the Low Light case and 27682 image patches tested in the Daylight case. The test images comprise 18 vehicles under Low Light and 17 under Daylight. Most of the image patches being tested are non-vehicles.

TABLE 3

| Threshold | Low Light Fa/Fr | Low Light Td | Daylight Fa/Fr | Daylight Td | Combined Fa/Fr | Combined Td |
|---|---|---|---|---|---|---|
| −0.04 | 1.30 | 1.00 | 1.80 | 1.00 | 1.55 | 1.00 |
| −0.02 | 0.40 | 1.00 | 1.00 | 1.00 | 0.70 | 1.00 |
| 0.00 | 0.10 | 1.00 | 0.50 | 1.00 | 0.30 | 1.00 |
| 0.02 | 0.10 | 0.94 | 0.20 | 1.00 | 0.15 | 0.97 |
| 0.04 | 0.10 | 0.89 | 0.00 | 1.00 | 0.05 | 0.94 |
| 0.06 | 0.00 | 0.78 | 0.00 | 0.94 | 0.00 | 0.86 |

Figure 9:
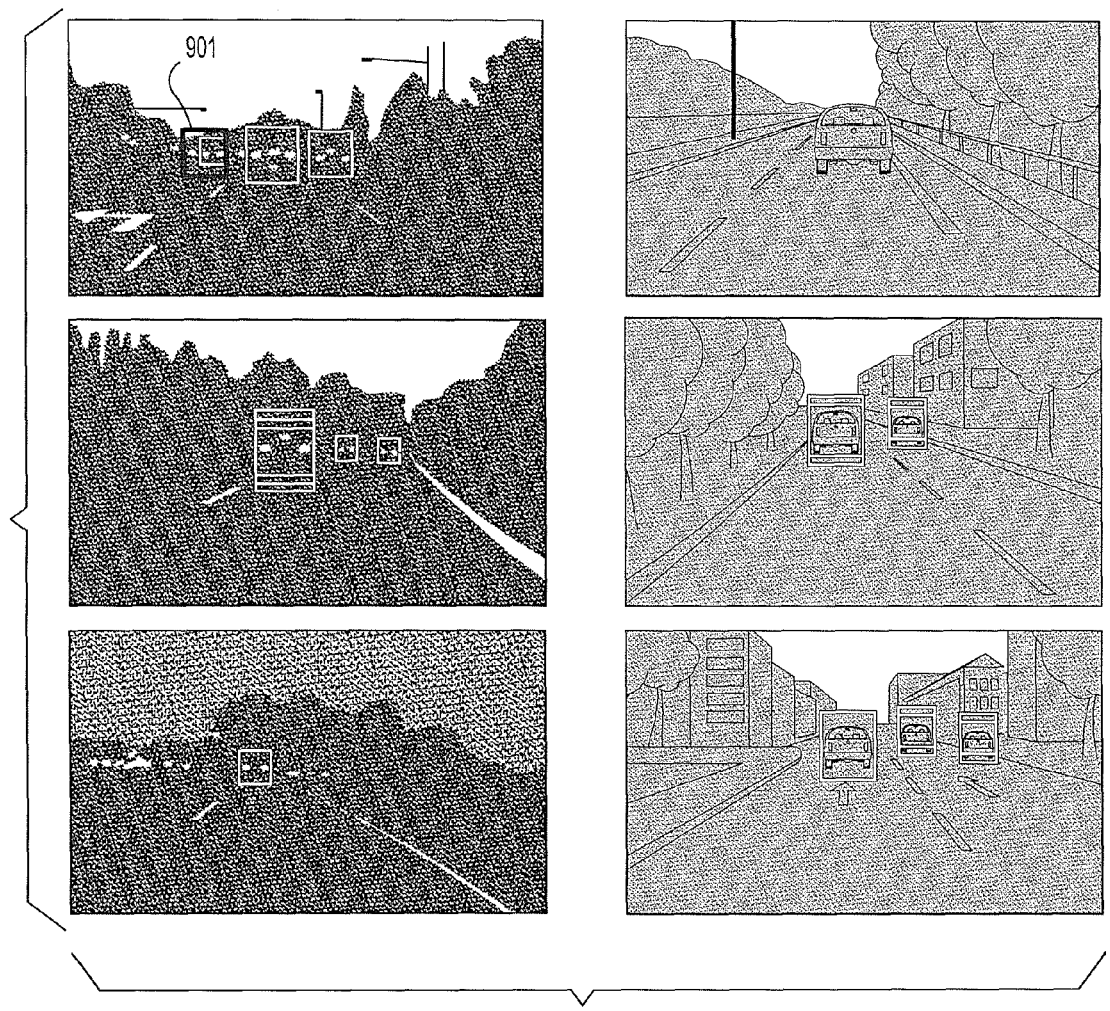
FIG. 9 illustrates images processed in accordance with various aspects of the present invention.

Table 3 displays the receiver operating characteristics (ROC), where a set of true detection rates and the corresponding number of false alarms per frame were calculated by varying the threshold value on the classifier response. Zero miss and zero false alarm was achieved by the Daylight detector when the threshold was set to 0.04. In the Low Light case, when the threshold value was set to 0, the detector produced one false alarm and no miss. Context switch was automatically done using the context categorization procedure. Consistent with the previous experiment, the detector performs better under the Daylight condition than the Low Light case. FIG. 9 shows examples of detection results. True detections are shown in grey square windows and false alarms in a black square. Pictures on the left in FIG. 9 are categorized as Low Light, those on the right as Daylight. Black square 901 in FIG. 9 identifies a false alarm.

In summary: the concept of context-adaptive vehicle detection was provided. The effect of environmental lighting was addressed and the possibility of applying adaptive detectors to deal with varying lighting conditions was explained. A context switch engine was introduced to categorize the lighting condition, and specialized detectors were learned for each category. Good results were obtained in preliminary testing in terms of improvement in the detection accuracy.

System

Figure 10:
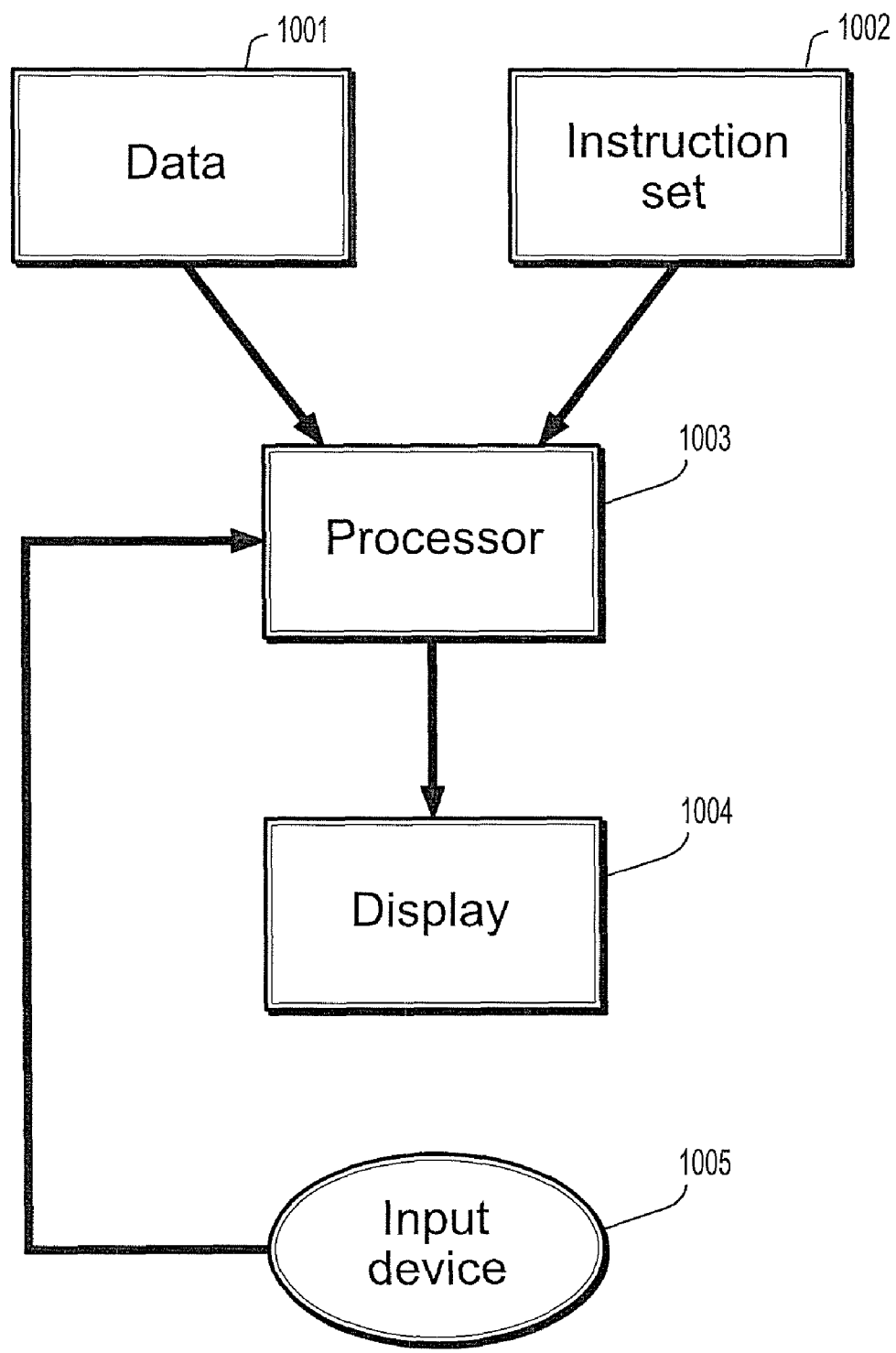
FIG. 10 illustrates a computer system that is used to perform the steps described herein in accordance with another aspect of the present invention.

The vehicle detection methods that are aspects of the present invention can be executed by a system as shown in FIG. 10. The system is provided with data 1001 representing image data. An instruction set or program 1002 executing the methods of the present invention is provided and combined with the data in a processor 1003, which can process the instructions of 1002 applied to the data 1001. An image or an alert can be outputted on a device 1004. Such a device for instance in training mode can be a display. However in operational situation such device may be an audio output device to provide an alert or for instance a control system for a brake, or any other device that may apply recognition of a vehicle. The processor can be dedicated hardware. However, the processor can also be a CPU or any other computing device that can execute the instructions of 1002. An input device 1005 like a mouse, or track-ball or other input device may be present to allow a user to select an initial object. However such an input device may also not be present in operational situations. Accordingly the system as shown in FIG. 10 provides a system for vehicle detection using methods disclosed herein.

A Night Time Detector

In day light condition, image features such as symmetry, shadows, corners, edges, textures, etc are often used in vision algorithms for vehicle detection. However, most of these cues are not available at night time. Instead, vehicle lights become the most salient feature for vehicle detection and tracking. Bright spots created by headlights, taillights and brake lights are useful cues to identify vehicles at night. Existing approaches include using color information to detect vehicle lights. Also vehicle taillights were modeled as circular disks. It was suggested to use symmetry and circle detection to identify tail lamps. Visual cues Were fused with radar data for vehicle tracking This approach works well when the bright areas created by the taillights of a target vehicle were clearly separated from bright areas created by the headlights and taillights of other vehicles. Another approach includes a vision and sonar-based system where vehicle lights were detected by extracting bright image regions based on their size and shape. Also it was suggested to apply a rule-based method which obtains potential headlights and taillights by clustering bright image areas.

Figure 11:
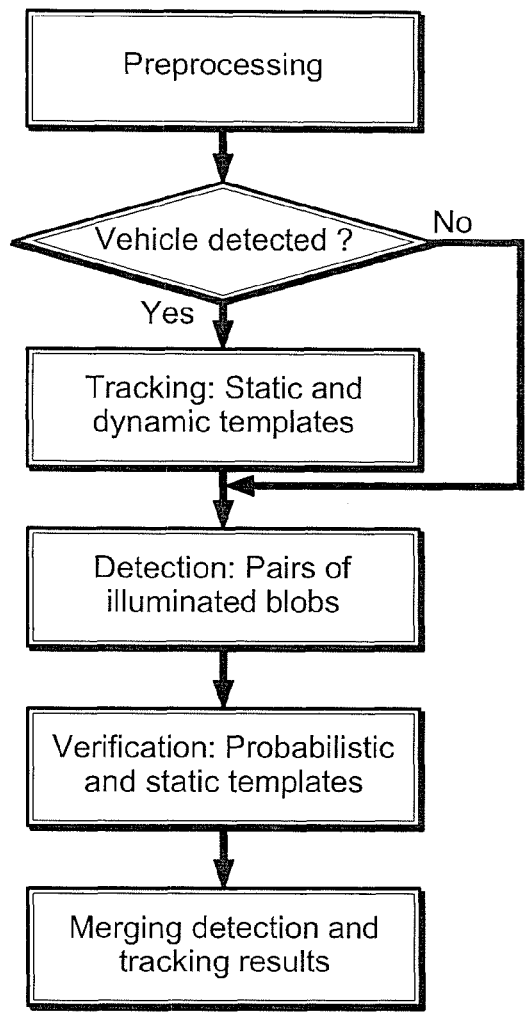
FIG. 11 is a flow diagram for a vehicle detection and tracking method under a night condition.

As one aspect of the present invention a new method to detect and track a leading vehicle by analyzing vehicle taillights is provided. Existing approaches are extended with new elements and will use information about vehicle lights, geometry and temporal correlation to derive multiple constraints on a pair of moving taillights. Image areas illuminated by vehicle lights are characterized by a probabilistic model learned from image examples. Vehicle detection is performed through the process of hypothesis generation and verification with multiple constraints. Once the leading vehicle is identified, a combination of offline and online template models are used to track the target vehicle Tracking An overview of the detection and tracking process is illustrated in FIG. 11. As a new image frame is acquired, preprocessing is performed, where illuminated image regions are extracted. If a leading vehicle has been identified in previous frames, a tracking engine extends the vehicle track into the new frame using template-based matching. Multiple static and dynamic templates are maintained and updated to characterize various illumination patterns from vehicle taillights and brake lights in different distance ranges. In the meanwhile, a detection engine is used to identify new vehicles. To initiate a new vehicle track, initial hypotheses are generated by detecting pairs of white blobs from illuminated image areas. A probabilistic template learned offline is used to verify and prune hypotheses and output detection results. Detection results and tracking results are merged to prune hypotheses and find the single best track to follow. If the leading vehicle moves out of the lane, the vision system automatically focuses on the next vehicle ahead.

Vehicle Detection

Figure 12:
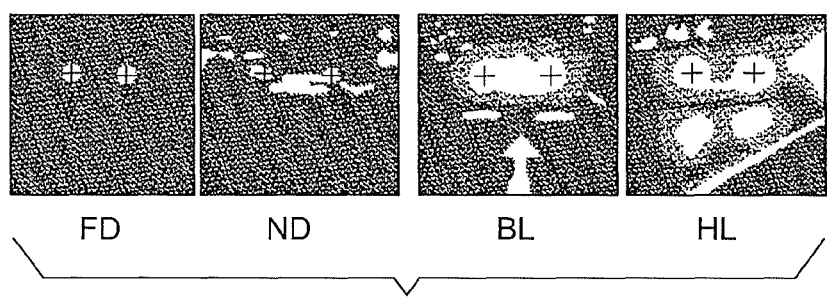
FIG. 12 illustrates illumination patterns generated by vehicle lights.

At night time, preceding vehicles are seen through their tail lights and brake lights. The image regions illuminated by vehicle lights vary according to the light source, the distance to the preceding vehicle as well as whether multiple vehicles appear close to each other. Due to light attenuation in space, various illumination patterns are observed of vehicles at different distance ranges. FIG. 12 shows that when a leading vehicle is far away, the most salient signature of its appearance is a pair of bright spots generated by taillights. Herein FD means: taillights in far-distance; ND: taillights in near-distance; BL: brake lights on; HL: Headlights of upcoming vehicles. When a leading vehicle is in near distance, strong reflections on its license plate and rear bumper are clearly visible. When a vehicle's brake lights are switched on, a large illuminated area is observed. In general, one can categorize the illumination patterns generated by a leading vehicle into three types: "far-distance", "near-distance" and "brake on". In addition, headlights and reflection on the road surface ahead are strong signatures of upcoming vehicles. Herein as an aspect of the present invention the focus is on detecting and tracking a preceding vehicle. The method provided here as an aspect of the present invention can be extended to detecting and tracking upcoming vehicles as well.

To characterize various illumination patterns generated by vehicle lights, a coarse to fine modeling scheme is applied. At the coarse level, a probabilistic model is learned from vehicle examples to provide the likelihood of pixels being lighted in vehicle areas. This model takes into account the variation among different illumination pattern and applies to all preceding vehicles. At the fine level, a template-based model is used to describe specific illumination patterns observed from vehicles at different distances.

Detection is performed in every acquired frame. The image region for leading vehicle detection is determined by projecting the ground plane with a lateral coverage equivalent to a lane width into the image plane. Detection starts with generating vehicle hypotheses by finding pairs of illuminated blobs followed by hypothesis verification with probabilistic and template-based models and other constraints.

Preprocessing

In preprocessing, an input image is binarized through a procedure called illumination line extraction to extract image regions illuminated by lights. An illumination line, denoted as I-Line, is defined as a segment of an image row $\{x_0, x_0+1, \ldots, x_0+N\}$ where the intensity of image pixels $\{I(x_i)\}$ on the I-Line is above a threshold T and monotonically increasing or decreasing:

$$T \leq I(x_0) \leq I(x_0+1) \leq \ldots \leq I(x_0+m)$$

$$I(x_0+m) \geq (x_0+m+1) \geq \ldots \geq I(x_0+N) \geq T$$

with m<N.

The monotonicity requirement makes use of the fact that the center of a light source has strongest illumination, and image pixels in the center of a light blob has highest intensity values and the intensity value monotonically decreases as the distance to the center increases. The image frame is binarized by assigning pixels on I-Lines to be "1" and the remaining pixels to be "0". Isolated noise pixels are automatically removed from I-Lines.

Hypothesis Generation

To detect an illuminated blob, the set of illumination lines are scanned and searched for vertically overlapped illumination lines represented as $\{(y_i, x0_i, x1_i):i=1,2,\ldots\}$, where $(y_i, x0_i, x1_i)$ represents respectively the vertical position, the left most and the right most horizontal positions of the i-th illumination line. A hypothesized blob center $(y_c, x_c)$ is defined as:

$$x_c = \text{median}\left\{\frac{x0_i + x1_i}{2} : 1 = 1,2,\ldots\right\} \quad (1)$$
$$y_c = \text{median}\{y_i : i = 1,2,\ldots\}$$

Figure 13:
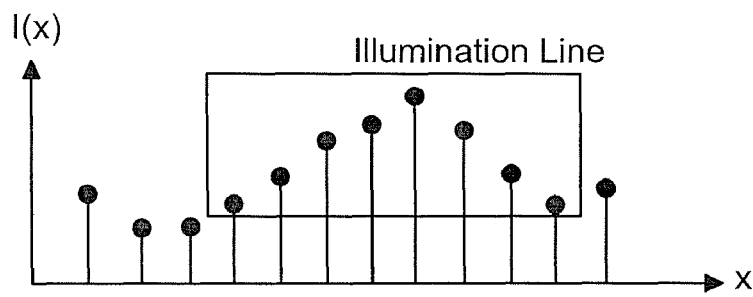
FIG. 13 illustrates the concept of illumination line.

The median operator is used for robustness against short and fragmented illumination lines. FIG. 13 illustrates the concept of an illumination line Once an illuminated blob is detected, the second blob to form a vehicle hypothesis will be searched for. The distance between the two blobs is determined by the mean width of vehicles. Given the vertical location of a blob center, and assuming flat road surface and the height of tail-lights relative to the ground (e.g. between 0.6~1 m) as well as their lateral distance (e.g. 0.8~1.2 m), a rough estimate of the target distance to the camera as well as the distance between two tail-lights in the image plane are obtained. The search region for the second blob is determined by the distance between two taillights in the image plane. Inside the search region, the algorithm identifies hypotheses for the second blob. Vehicle hypotheses are then formulated by pairs of blobs at similar vertical positions and with proper horizontal spacing.

Hypothesis Verification

Verification by the Probabilistic Template.

The probabilistic template is learned offline from image examples of preceding vehicles captured at night time. The probabilistic template is defined on binary images. Denote an image patch with M×N pixels as $$\{I(x,y):x=1,\ldots M, y=1, \ldots N; I(x,y)=0 \text{ or } 1\}.$$

The probabilistic template is defined as a naïve Bayes $$p(\{I(x,y)\}) = \prod_{x,y} P(I(x,y) = 1) \quad (2)$$

Figure 14:
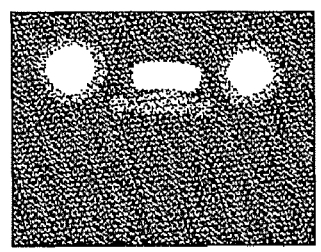
FIG. 14 is an image of a probabilistic template.

The probability term $P(I(x,y)=1)$ is learned from vehicle examples. FIG. 14 shows a probabilistic template, where the pixel intensity is proportional to the probability that a pixel is quantized to "1". Hypothesis verification is performed by comparing the likelihood of the hypothesized vehicle area against a threshold.

$$p(\{I(x,y)\}) \begin{cases} >= \text{threshold} & \text{accept} \\ < \text{threshold} & \text{reject} \end{cases} \quad (3)$$

Verification by Blob Size

The size of the illuminated blobs scales along the target distance. The closer the target is, the larger the blobs are. A test is performed on the size of the blob pair as well. If the size of any blob does not comply with a pre-determined range, the hypothesis is then rejected.

Verification by Static Templates

Figure 15:
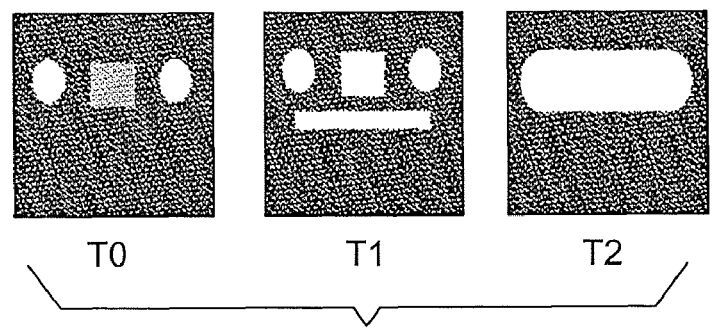
FIG. 15 shows three static templates representing various illumination patterns generated by vehicle tail lights.

To characterize the various illumination patterns of preceding vehicles at different distance ranges, three static templates are defined as follows and are illustrated in FIG. 15. T0 is used to characterize the illumination pattern of vehicles at far distances, where two tail lights are most salient. The rectangle depicted in gray is a mask that excludes the area from the template because the reflection on the license plate is observed in some case and not observed in other cases. T1 is used to characterize the illumination pattern of taillights at near distances, where the tail-lights as well as reflections on the license plate and the rear bumper are clearly visible. T2 is used to characterize the illumination pattern of vehicles with brake lights on.

Verification is performed in two steps. First, a switch engine is used to select a template from T0, T1, T2. Second, template matching is performed to verify the hypotheses.

Template Selection

Template selection is performed in two steps. First, brake light detection is performed by counting the number illuminated pixels in the area between two illuminated blobs. If the number of illuminated pixels is sufficiently high, then it is decided that brake lights are turned on and T2 is used in template matching. Otherwise, the vehicle location in the world coordinate system is estimated from the image location of two presumed tail lights, and if the target vehicle is sufficiently far away from the camera, it is decided that the target is in far-distance and T0 is used in template matching; otherwise, it is decided that the target is in near-distance and T2 is used in template matching.

Template Matching.

A template is divided into two regions: dark region and bright region. A matching score is calculated as follows:

$$\frac{|(x,y):I(u,v)=1 \text{ and } T(x,y)=1 \text{ and } \tau(u,v)=[x,y]|}{|(x,y):T(x,y)=1|} + \frac{|(x,y):I(u,v)=0 \text{ and } T(x,y)=0 \text{ and } \tau(u,v)=[x,y]|}{|(x,y):T(x,y)=0|} \quad (4)$$

where $I(u,v)$ denotes a pixel value in the testing image, $T(u,v)$ denotes a pixel value in a static template, $|.|$ denotes the number of elements, and $\tau(u,v)$ denotes the transformation (scaling and translation) that maps an image region to the size of the template. A hypothesis is accepted if the matching score is above a threshold and rejected otherwise.

Vehicle Tracking

Tracking is performed if a vehicle track has been established. Template matching involving static and dynamic templates as well as additional constraints are used to track a target vehicle. Tracking is performed through the following steps.

Initialization of Dynamic Templates

When a hypothesis is accepted by all verification steps for the first time, a dynamic template is defined by the image region of the verified vehicle hypothesis. The status of the dynamic template is assigned as "far-distance" (DT0), "near-distance" (DT1) or "brake-on" (DT2) according to the status of the target vehicle. Compared to the static templates which provide a generic description of all vehicles, the dynamic templates defined here give a more specific description for the particular vehicle instance being tracked.

Defining the Hypothesis Space

Figure 16:
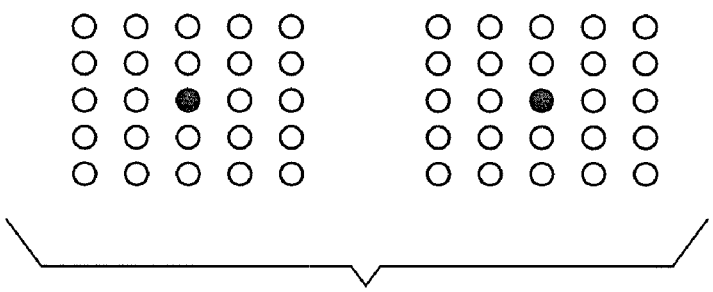
FIG. 16 illustrates hypotheses of the position of tail lights.

Given the target location in a previous frame, a search region is defined for each blob center in the current frame. The search region is centered around the previous target location and its size is defined by the maximum distance the target vehicle can move between two consecutive frames. FIG. 16 shows an example of hypotheses of the position of the left and right tail lights. Solid circles represent the target location in a previous frame. The search region is sampled with equally spaced samples and these samples compose the initial hypotheses.

Geometry Constraint

The geometry constraint used to prune hypotheses utilizes the fact that knowing the 3D width of vehicles, their 2D width in the image plane can be estimated through perspective geometry. Assume $(x_l,y_l)(x_r,y_r)$ are the hypothetic locations of the left and right tail lights in the current frame, and $(x_{l,0},y_{l,0})$ $(x_{r,0},y_{r,0})$ are the estimated location of the left and right tail lights in the previous frame. The geometry constraint is stated as follows:

$$|y_r - y_l| < \text{Threshold}$$

$$|x_r - x_l| > (1-\delta)|x_{r,0} - x_{l,0}| \text{ if } \frac{(y_l+y_r)}{2} > \frac{(y_{l,0}+y_{r,0})}{2}$$

$$|x_r - x_l| < (1+\delta)|x_{r,0} - x_{l,0}| \text{ if } \frac{(y_l+y_r)}{2} <= \frac{(y_{l,0}+y_{r,0})}{2}$$

$$\text{width\_min}\left(\frac{y_l+y_r}{2}\right) < |x_r - x_l| < \text{width\_max}\left(\frac{y_l+y_r}{2}\right) \text{ where}$$

$$\text{width\_min}\left(\frac{y_l+y_r}{2}\right) \text{ and width\_max}\left(\frac{y_l+y_r}{2}\right)$$

are the minimal and maximal image width of a vehicle whose vertical location in the image plane is $$\left(\frac{y_l+y_r}{2}\right).$$

These parameters can be pre-calculated through perspective transformations. The first constraint on $|y_r-y_l|$ states that the two taillights should be vertically aligned. The constraints on the horizontal spacing between two taillights $|x_r-x_l|$ comply with the perspective geometry.

Solidness of Blobs

The solidness of a blob is defined as the percentage of illuminated pixels inside a blob. The solidness of the left and right blobs from a hypothesis is compared against a threshold. The hypothesis is rejected if the solidness of either blob is too low.

Template Matching with Static Templates

This procedure is the same as the procedure used in detection. First, a switch engine is used to select a template from T0, T1, T2. Second, template matching is performed to verify the hypothesis. Top N hypotheses with the highest matching scores are retained.

Template Matching with Dynamic Templates

Template matching with dynamic templates is performed in two steps. First, a switch engine is used to select a template from DT0, DT1, DT2. Second, template matching is performed to select the best single hypothesis. Template selection is conducted in the same way as discussed in the earlier section on hypothesis verification. The status of the current vehicle appearance is identified as "far-distance", "near-distance" or "brakes-on". A corresponding template is chosen from DT0, DT1, DT2 for template matching. The best single hypothesis is chosen as the hypothesis with the highest matching score, and is used as the estimate of the current vehicle location. If the corresponding dynamic template has not been initialized, a single best hypothesis is chosen based on matching scores obtained from the static template. The use of dynamic templates takes advantage of the temporal correlation of the same vehicle observed in multiple image frames.

Dynamic Template Update

Figure 17:
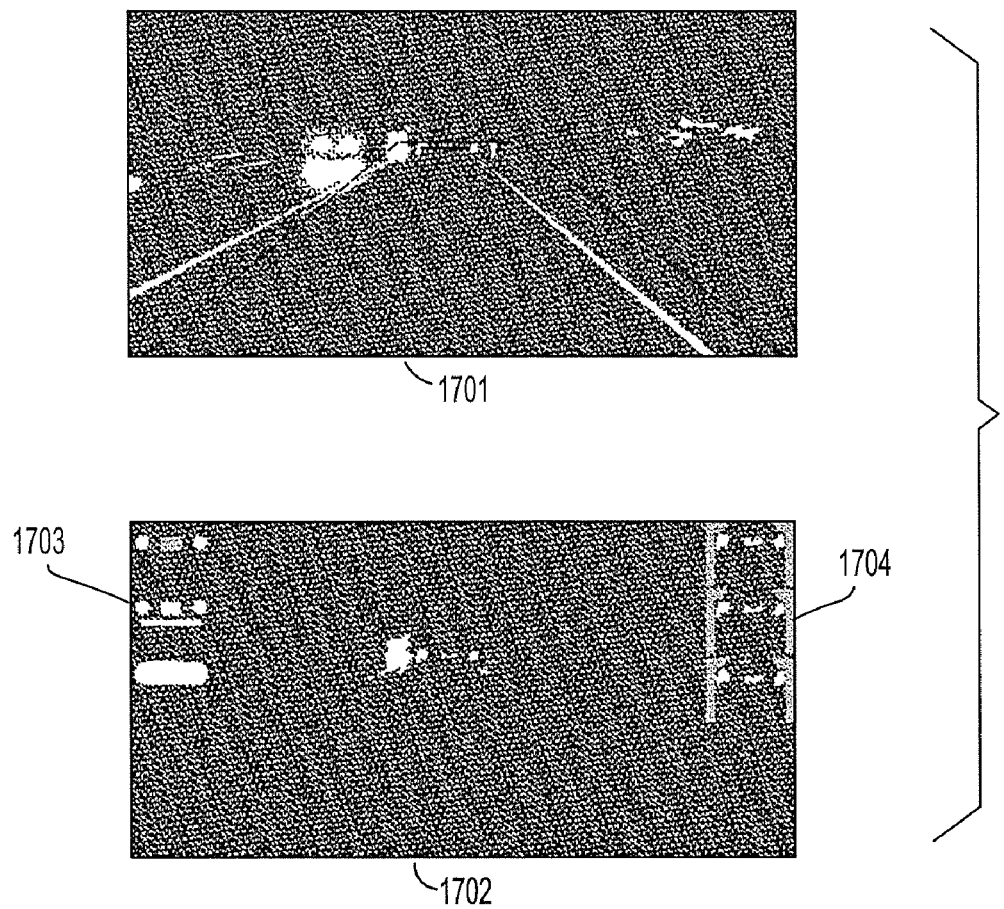
FIG. 17 illustrates static and dynamic templates representing various illumination patterns generated by vehicle tail lights.

The corresponding dynamic template is updated if the template has not been initialized or the best hypothesis obtained in the previous step has high matching scores with the chosen static template and the chosen dynamic template, and enough time has elapsed since the last time the corresponding template was updated. FIG. 17 shows the dynamic templates constructed online of a leading vehicle moving in mid to far distance range. FIG. 17 has two images 1701 and 1702. Image 1702 shows the leading vehicle moving in a mid to far distance range. Image 1702 shows the static templates 1703 on the left of the image 1702 built offline. The dynamic templates 1704 obtained online are shown on the right of image 1702.

Night-Time Detector Experiments

Figure 18:
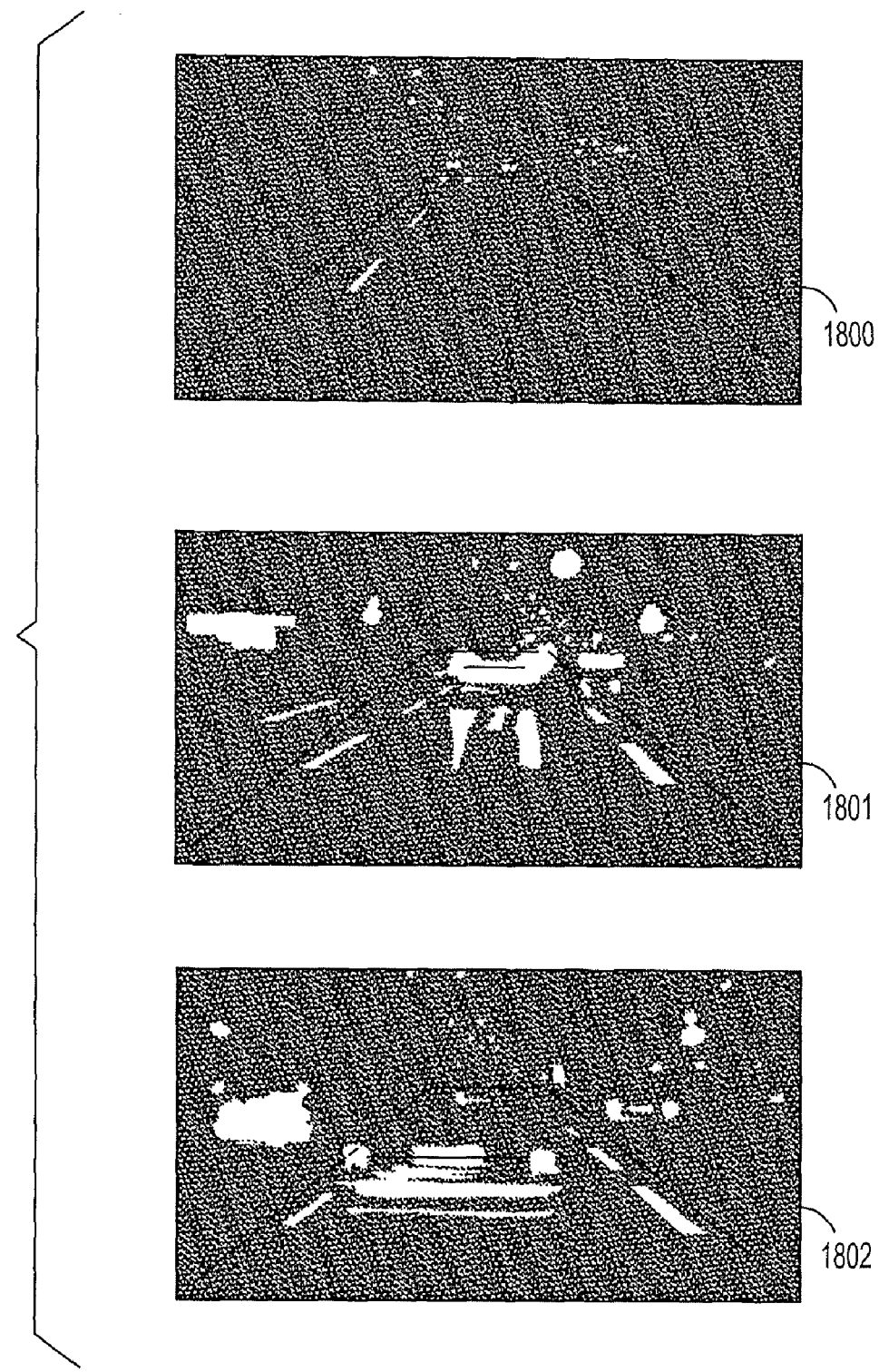
FIG. 18 is an example testing sequence for a night detector.
Figure 19:
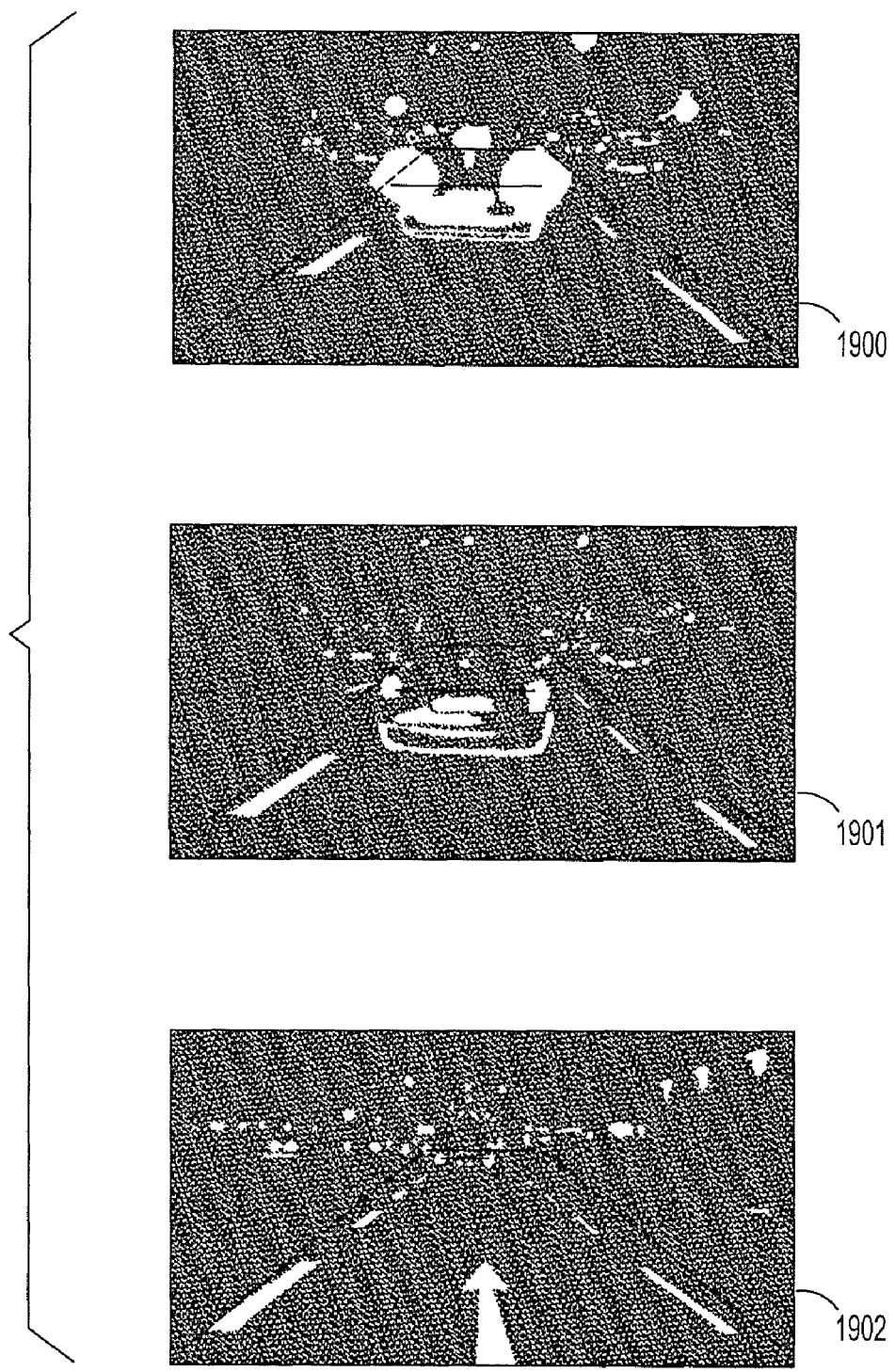
FIG. 19 is another example testing sequence for a night detector.

The proposed detection and tracking method has been tested on nighttime videos captured on road. The algorithm was implemented on a Pentium III platform. The system offers real time and effective performance on detecting and tracking leading vehicles. FIGS. 18 and 19 show representative examples of testing scenarios. In FIG. 18, the host car follows a leading vehicle to a full stop. The leading vehicle was detected in the first frame and tracked till it fully stopped. FIG. 18 has 3 images: 1800, 1801 and 1802, which are part of a series of 181 frames. Image 1800 is frame 0 of 181 frames, image 1801 is frame 89 of 181 frames and image 1802 is frame 174 of 181 frames. The image 1800 shows a first detection of a leading vehicle, and the tracking of the slowing leading car until a full stop in 1802. FIG. 19 shows the stop and go scenario, where the leading vehicle was detected stopped at an intersection and then slowly accelerating and leaving the intersection. FIG. 19 has 3 images: 1900, 1901 and 1902 representing individual frames out of a series of 338 frames. Image 1900 shows frame 91 of 338 with a leading vehicle with brake lights turned on at a full stop at an intersection. Image 1901 shows frame 112 of 338 with the leading car driving off, still having brake lights on. And image 1902 is frame 211 of 338 frames with the leading car leaving the intersection. Various illumination patterns caused by taillights, brake lights, reflections as well as other light sources such as road lamps, vehicle head lights and reflection on road signs are observed. The method was able to detect and track the leading vehicle in a reasonable distance range.

Accordingly a new vision algorithm is provided to detect and track a leading vehicle at night time, which can be applied in a context adaptive approach in vehicle detection under various visibility conditions. The detection algorithm follows a hypothesis generation and hypothesis verification approach to identify pairs of taillights and brake lights using multiple constraints learned or derived from vehicle lights and geometry. The tracking algorithm tracks the target vehicle through a combination of offline and online models which effectively exploit the general information of all vehicle lights as well as specific information of the particular target obtained online. This method has demonstrated to be effective in detecting and tracking leading vehicles in real scenarios.

The following references are generally descriptive of the background of the present invention and are hereby incorporated herein by reference: [1] I. Cabani, G. Toulminet, and A. Bensrhair. Color-based detection of vehicle lights. In *IEEE Intelligent Vehicle Symposium* 2005, pages 278-283, June 2005. [2] R. Cucchiara, M. Piccardi, and P. Mello. Image analysis and rule-based reasoning for a traffic monitoring system. In *IEEE/IEEJ/JSAI ITS '99*, pages 758-763, October 1999. [3] A. K. Jain, M. N. Murty, and P. J. Flynn. Data clustering: A review. *Computing Surveys,* 31(3), September 1999. [4] S. Kim, S.-Y. Oh, J. Kang, Y. Ryu, K. Kim, S-C. Park, and K. Park. Front and rear vehicle detection and tracking in the day and night times using vision and sonar sensor fusion. In *IEEE International Conference on Intelligent Robots and Systems*, pages 2173-2178, 2005. [5] R. E. Schapire and Y. Singer. Improved boosting algorithms using confidence-rated predictions. *Machine Learning,* 37(3):297 336, 1999. [6] Y. Shan, F. Han, H. S. Sawhney, and R. Kumar. Learning exemplar-based categorization for the detection of multi-view multi-pose objects. In *IEEE Computer Society Conference on Computer Vision and Pattern Recognition*, volume 2, pages 1431-1438, June 2006. [7] K.-T. Song and C-C. Yang. Front vehicle tracking using scene analysis. In *IEEE International Conference on Mechatronics and Automation* 2005, volume 3, pages 1323-1328, July 2005. [8] Z. Sun, G. Bebis, and R. Miller. On-road vehicle detection: A review. *Transactions on Pattern Analysis and Machine Intelligence,* 28(5), May 2006. [9] P. Viola and M. J. Jones. Rapid object detection using a boosted cascade of simple features. In *IEEE CVPR* 2001, pages 511-518, December 2001. [10] Y. Zhu, D. Comaniciu, M. Pellkofer, and T. Koehler. Reliable detection of overtaking vehicles using robust information fusion. IEEE Transactions on Intelligent Transportation Systems, Vol. 7, Issue 4, pages 401-414, December 2006. [11] Y. Zhu, D. Comaniciu, M. Pellkofer, and T. Koehler. An integrated framework of vision-based vehicle detection with knowledge fusion. In *IEEE Intelligent Vehicles Symposium*, pages 199-204, June 2005. [12] Y. Zhu, X. Gao, G. Baratoff, and T. Koehler. Preceding vehicle detection and tracking at night with a monocular camera. In submitted to *IEEE ITSC*, 2007.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for adaptive detection by a processor of an object in an image represented by image data, by using a plurality of data-driven clusters, each of the plurality of data-driven clusters being characterized by a range of values of one or more statistical parameters associated with a plurality of prior images, each data-driven cluster being part of a context category, a context category being part of a plurality of context categories, the plurality of data-driven clusters being greater than the plurality of context categories, comprising:
  receiving the image;
  determining a value for each of the one or more statistical parameters of a part of the image that contains the object by the processor;
  the processor learning the data-driven clusters from the plurality of prior images, each of the prior images being acquired in a different lighting condition, a different traffic condition or a different camera setting;
  assigning the image to one of the plurality of data-driven clusters according to the determined value of each of the one or more statistical parameters of the part of the image;
  associating by the processor of the one of the plurality of data-driven clusters with one of at least three context categories, the at least three categories including a daylight, a lowlight and a nightlight category;
  context adaptive learning of a classifier for detecting the object based on the one of at least three context categories associated with the assigned one of the plurality of data-driven clusters; and
  detecting the object using the classifier.

2. The method as claimed in claim 1, wherein the classifier for detecting the object is learned based on the context category associated with the assigned one of the plurality of data-driven clusters.

3. The method as claimed in claim 1, wherein the object is a vehicle.

4. The method as claimed in claim 1, wherein the plurality of context categories includes at least a category of low light conditions, day light conditions, night conditions and saturation.

5. The method as claimed in claim 1, wherein the one or more statistical parameters of the image include a Bhattacharyya distance between an intensity histogram of the image and an intensity histogram associated with one of a plurality of cluster centers.

6. The method as claimed in claim 1, wherein a plurality of clusters is defined by clustering a plurality of images into k clusters by applying a k-mean algorithm in the space of intensity histograms, an intensity histogram is associated with a cluster center, and a Bhattacharyya distance between two intensity histograms is used in the k-mean algorithm.

7. The method as claimed in claim 1, wherein the classifier will detect the object by recognizing one or more features of a plurality of features of the object in an image, a success of recognizing a feature of the object depending on lighting conditions.

8. The method as claimed in claim 7, wherein the classifier is trained to look for one or more features to detect the object, the one or more features being optimal for detection under determined lighting conditions.

9. The method as claimed in claim 8, wherein the training of the classifier is assisted by an adaptive boosting algorithm.

10. The method as claimed in claim 9, wherein the boosting algorithm is AdaBoost.

11. The method as claimed in claim 7, wherein the object is a vehicle and the plurality of features includes at least one of a group of features consisting of features of edge, texture, contour and tail-lights of the vehicle.

12. A system for adaptive detection of an object in an image by using a plurality of data-driven clusters, each of the plurality of data-driven clusters being characterized by a range of values of one or more statistical parameters associated with a plurality of prior images, each data-driven cluster being part of a context category, a context category being part of a plurality of context categories, the plurality of data-driven clusters being greater than the plurality of context categories, comprising:
  a processor;
  software operable on the processor to:
    receiving the image;
    determining a value for each of the one or more statistical parameters of of a part the image that contains the object;
    the processor learning the data-driven clusters from the plurality of prior images, each of the prior images being acquired in a different lighting condition, a different traffic condition or a different camera setting;
    assigning the image to one of the plurality of data-driven clusters according to the determined value of each of the one or more statistical parameters of a part of the image that contains the object;
    associating by the processor of the one of the plurality of data-driven clusters with one of at least three context categories, the at least three categories including a daylight, a lowlight and a nightlight category;
    context adaptive learning of a classifier for detecting the object based on the one of at least three context categories associated with the assigned one of the plurality of data-driven clusters; and
    detecting the object using the classifier.

13. The system as claimed in claim 12, wherein the object is a vehicle.

14. The system as claimed in claim 12, wherein the plurality of context categories includes at least a category of low light conditions, day light conditions, night conditions and saturation.

15. The system as claimed in claim 12, wherein the one or more statistical parameters of the image include a Bhattacharyya distance between an intensity histogram of the image and an intensity histogram associated with one of a plurality of cluster centers.

16. The system as claimed in claim 12, wherein a plurality of clusters is defined by clustering a plurality of images into k clusters by applying a k-mean algorithm in a space of intensity histograms, an intensity histogram is associated with a cluster center, and a Bhattacharyya distance between two intensity histograms is used in the k-mean algorithm.

17. The system as claimed in claim 12, wherein the classifier will detect the object by recognizing one or more features of a plurality of features of the object in an image, a success of recognizing a feature of the object depending on lighting conditions.

18. The system as claimed in claim 17, wherein the classifier is trained to look for one or more features to detect the object, the one or more features being optimal for detection under determined lighting conditions.

19. The system as claimed in claim 18, wherein the training of the classifier is assisted by an adaptive boosting algorithm.

20. The system as claimed in claim 19, wherein the boosting algorithm is AdaBoost.

21. The system as claimed in claim 17, wherein the object is a vehicle and the plurality of features includes at least one of a group of features consisting of edge, texture, contour and tail-lights of the vehicle.

* * * * *